United States Patent Office 2,862,929
Patented Dec. 2, 1958

2,862,929

PROCESS FOR HALOGENATING COMPOUNDS HAVING A TETRAZA-PORPHIN STRUCTURE

Armin Caliezi, Basel, Walter Kern, Sissach, and Theodor Holbro, Basel, Switzerland, assignors to Ciba Limited, Basel, Switzerland, a Swiss firm No Drawing. Application March 12, 1956
Serial No. 570,694

Claims priority, application Switzerland March 18, 1955

11 Claims. (Cl. 260—314.5)

Many processes are known for introducing halogen atoms into the phthalocyanine molecule. In these processes there is generally used a free halogen, for example, chlorine or a product such as sulfuryl chloride, which acts like a mixture of sulfur dioxide and free chlorine, but in many cases these processes have considerable disadvantages, for example, in that the reaction proceeds very slowly on a large commercial scale, or due to the fact that the free halogen or the hydrogen halide liberated during the halogenation attacks the apparatus used especially when the halogenation proceeds in the desired manner only under relatively severe conditions. Severe conditions are especially necessary for obtaining phthalocyanines having a high content of chlorine. An accurate control of the quantities of these conventional halogenating agents is difficult owing to their volatility, and in many cases the halogenation products obtained from different batches of the same starting materials frequently differ from one another in their composition. This is especially disadvantageous in the case of highly chlorinated phthalocyanines, with which a slight change in composition can lead to relatively large changes in the tints of the dyeings produced therewith.

The present invention is based on the observation that compounds containing the tetraza-porphin structure, for example, the known phthalocyanines, and especially copper phthalocyanine, can be halogenated with advantage by heating them with an anhydrous halogenating agent, which contains a compound of the Friedel-Crafts' type and sulfur trioxide, anhydrous sulfuric acid or a compound of the general formula R—SO$_2$-halogen in which R represents an —OH or —O-metal group or an organic radical.

The present process is especially suitable for introducing a large number of halogen atoms into the aforesaid compounds.

As compounds of the Friedel-Crafts' type there may be used, with advantage the trihalides of iron or aluminum, which are frequently used as compounds of the Friedel-Crafts' type, for example, aluminum chloride, or ferric chloride.

As compounds of the general formula R—SO$_2$-halogen there may be used, for example, chlorosulfonic acid or fluorosulfonic acid or metal salts of these acids, for example, the sodium salts. Unexpectedly, simple organic sulfonic acid chlorides, which are not themselves easily capable of being chlorinated, especialy alkane-sulfonic acid chlorides, such as methane sulfonic acid chloride, act in a similar manner. Generally speaking, sulfur trioxide or sulfuric acid containing large amounts of sulfur trioxide (oleum) or anhydrous sulfuric acid can also be used in a similar manner, especially when the reaction conditions are such that a compound of the above formula R—SO$_2$-halogen can be formed therefrom.

In many cases it is of advantage to add to the anhydrous halogenating agent of the above constitution a further substance which lowers the melting point, for example, sodium chloride, sodium fluoride, calcium chloride, potassium chloride, sulfur dioxide, sodium sulfite or magnesium sulfate.

The halogenating agent can be prepared in a simple manner by mixing together the aforesaid substances, although in certain cases it may be uncertain to what extent the components of the mixture react together before the halogenation reaction sets in. In many cases it is of advantage to add the compound of the formula R—SO$_2$-halogen (especially chlorosulfonic acid or sulfur trioxide or oleum) to the solid or molten compound of the Friedel-Crafts' type (for example, aluminum chloride), since in this manner the stirrability of the melt is often improved. In many cases the compound to be chlorinated may be introduced into a melt of a compound of the Friedel-Crafts' type, which is advantageously prepared with the substances mentioned above, and to add the sulfur trioxide or the compound of the formula R—SO$_2$-halogen as the final component. The halogenation must be carried out in an anhydrous medium. The temperature to be used generally depends on the temperature at which the halogenating agent forms a stirrable melt. Advantageously temperatures above 50° C. are used, for example about 120–180° C., or in certain cases temperatures above 200° C.

It is surprising that the present process can be carried out in such manner that, notwithstanding the presence of strong sulfonating compounds, practically no sulfur or sulfonic acid groups enter the molecule of the compound being treated. That sulfur trioxide or a compound of the formula R—SO$_2$-halogen nevertheless plays an important part in the halogenation reaction is evident from the fact that in general one halogen atom per molecule of R—SO$_2$-halogen is introduced into the compound to be halogenated.

The mechanism of the halogenation probably takes place with the formation of complex salts according to Equations 1 and 2, although the invention is in no way limited to this theory.

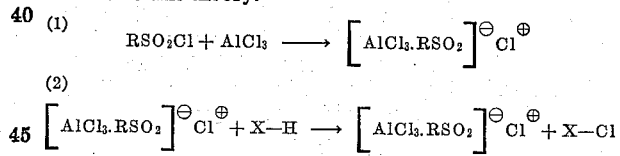

(1) $$RSO_2Cl + AlCl_3 \longrightarrow [AlCl_3.RSO_2]^{\ominus} Cl^{\oplus}$$

(2) $$[AlCl_3.RSO_2]^{\ominus} Cl^{\oplus} + X—H \longrightarrow [AlCl_3.RSO_2]^{\ominus} Cl^{\oplus} + X—Cl$$

In the above formulae R represents an —OH or —O-metal group or an organic radical, and X—H represents the compound to be halogenated.

As free halogen is not formed in the reaction carried out in the anhydrous liquid halogenating agent, the reaction can be conducted without causing substantial injury to the apparatus. It is also of advantage that in many cases the halogenation is complete within 1–2 hours.

The products obtainable by the present process are in part known or are isomeric with known products. The products free from groups imparting solubility in water are valuable blue to green pigments, or, when they contain sulfonic acid groups, they yield valuable dyeings on textile fibers, especially cotton. The products can be obtained by the present process in a much more simple and more reliable manner without causing injury to the reaction vessel and very often in an astonishingly short time. Furthermore, many of the products are obtained in a purer condition than when obtained by other halogenation processes.

The following examples illustrate the invention, the parts and percentages being by weight:

Example 1

A mixture of 100 parts of anhydrous aluminum chloride, 50 parts of chlorosulfonic acid, 10 parts of sodium chloride and 1 part of sodium fluoride are heated at 140–160° C. until a clear melt is obtained. Into the melt are introduced at about 140° C. 10 parts of copper phthalocyanine, the mixture is then stirred for one hour at 140° C. and for 2 hours at 160° C., and the melt is then poured into water and ice. The mixture is acidified with hydrochloric acid, stirred for one hour at 40–50° C., and filtered. The dyestuff filtered off, is washed neutral and dried, and is a pure green pigment having a chlorine content of 48–49%.

*Example 2*

A mixture of 320 parts of aluminum chloride, 52 parts of sodium chloride and 46.6 parts of chlorosulfonic acid is heated at 140° C. until a clear melt is obtained. The temperature is then lowered to 120° C. and 11.5 parts of copper phthalocyanine are introduced. The whole is stirred for one hour at 120° C. and for 1½ hours at 160° C. The dyestuff is then worked up as described in Example 1. It has a chlorine content of 48.1%.

*Example 3*

100 parts of aluminum chloride and 40 parts of chlorosulfonic acid are heated at 140° C. until a clear melt is obtained. Into the melt are introduced 10 parts of copper phthalocyanine, and the whole is then stirred for 4 hours at 150° C. The product is worked up as described in Example 1. The pigment so obtained is similar to that obtained in Example 1.

*Example 4*

200 parts of aluminum chloride and 52.5 parts of oleum of 66% strength are heated at 140° C. until a melt that is easily stirrable is obtained. To the melt are added 10 parts of copper phthalocyanine, the melt is heated to 160° C. and stirred for 16 hours at that temperature. By working up, there is obtained a green pigment similar to that obtained in Example 1.

*Example 5*

250 parts of aluminum chloride, 50 parts of sodium chloride and 45.3 parts of chlorosulfonic acid are heated at 160° C. until a clear melt is obtained. Into the melt are introduced 10 parts of metal-free phthalocyanine, and the melt is stirred for 4 hours at 160° C. The product is then worked up as described in Example 1. There is obtained a brilliant yellowish green pigment.

*Example 6*

To a melt of 100 parts of aluminum chloride, 10 parts of sodium chloride and 25.4 parts of chlorosulfonic acid, 5 parts of nickel phthalocyanine are added at 140° C., and the whole is stirred for one hour at 140° C., one hour at 160° C. and one hour at 180° C. By working up in the usual manner, there is obtained a blue green pigment containing about 48 percent of chlorine.

In the same manner cobalt, zinc, iron, aluminum, tin, chromium, manganese or magnesium phthalocyanine or other metal phthalocyanine can be chlorinated.

*Example 7*

10 parts of copper phthalocyanine are added to a melt at 120° C. of 100 parts of aluminum chloride, 8 parts of sodium chloride and 2.4 parts of chlorosulfonic acid. The melt is then heated to 140° C. and stirred for one hour at that temperature. The pigment so obtained has a chlorine content of 7 percent.

Instead of chlorosulfonic acid there may be used an equivalent proportion of its sodium or calcium salt.

*Example 8*

A mixture of 160 parts of aluminum chloride, 36 parts of chlorosulfonic acid and 20 parts of copper phthalocyanine is heated at 120° C. until a stirrable homogeneous melt is obtained. 36 parts of chlorosulfonic acid are then added dropwise in the course of one hour, and the whole is then heated to 150° C. The mixture is stirred for one hour at 150° C., the temperature is then raised in the course of 3 hours to 180° C. without stirring, and the latter temperature is maintained for a further 2 hours. The isolated product is practically identical with that obtained in Example 1.

*Example 9*

A mixture of 150 parts of aluminum chloride, 20 parts of sodium chloride, 11.2 parts of methane sulfochloride and 10 parts of copper phthalocyanine is fused at 120° C., and then stirred for one hour at that temperature and for a further hour at 140° C. By working up as described in Example 1, there is obtained a sulfur-free pigment having a chlorine content of about 8 percent.

*Example 10*

5 parts of copper phthalocyanine are added to a melt at 140° C. of 100 parts of aluminum chloride, 15 parts of sodium chloride and 17 parts of sulfuric acid. The mass is stirred for 1½ hours at 140° C., and then for a further 1½ hours at 180° C. By working up in the usual manner there is obtained a pigment containing about 23 percent of chlorine.

*Example 11*

10 parts of chlorosulfonic acid are introduced dropwise into a melt at 120° C. of 130 parts of aluminum chloride, 20 parts of sodium chloride and 10.8 parts of sodium copper-phthalocyanine disulfonate, the melt is heated to 160° C. and stirred at that temperature for ½ hour. The reaction mixture is then poured onto a mixture of 2000 parts of ice and water, 500 parts of concentrated hydrochloric acid are added, and the dyestuff is filtered off. It is washed with hydrochloric acid of 10 percent strength and dried in vacuo. The dyestuff contains about 16 percent of chlorine and dyes cotton from solutions rendered alkaline with sodium carbonate fast turquoise blue tints.

*Example 12*

5 parts of copper-phthalocyanine are added at 160° C. to a melt of 80 parts of ferric chloride, 16 parts of sodium chloride, and 10 parts of chlorosulfonic acid, and the mixture is stirred for 20 minutes at 160° C. It is then poured on to 500 parts of hot water. When all the iron salt is dissolved, the pigment is filtered off and washed neutral with water. It contains about 33% of chlorine.

*Example 13*

A stream of sulfur dioxide is passed over a melt of 80 parts of aluminum chloride, 10 parts of sodium chloride and 36.5 parts of chlorosulfonic acid for half an hour at 120–140° C. 10 parts of copper-phthalocyanine are then added and the temperature raised in the course of 4 hours to 180° C., a stream of sulfur dioxide being passed continuously over the melt. After working up in the usual manner, a pigment is obtained containing about 47% of chlorine.

*Example 14*

20 parts of copper-phthalocyanine are added to a melt of 160 parts of aluminum chloride, 10 parts of sodium chloride and 62.2 parts of fluoro-sulfonic acid at 120° C. The temperature is raised in the course of 3 hours to 180° C. and the whole stirred for 2 hours at 180–190° C. After working up in the manner described in Example 1, a pigment is obtained containing about 42% of chlorine.

What is claimed is:

1. A process for the halogenation of a phthalocyanine which comprises heating the said phthalocyanine in an anhydrous halogenating agent which consists essentially of on the one hand a compound of the Friedel-Crafts' type and on the other hand a compound hexavalent sulfur selected from the group consisting of sulfur trioxide, sulfuric acid, HO.SO$_2$-halogen, metal-O.SO$_2$-halogen and lower alkyl-O.SO$_2$-halogen, at least one mol of aluminum chloride being used per mol of phthalocyanine and per mol of chlorosulfonic acid.

2. A process for the halogenation of a phthalocyanine, which comprises heating at temperatures above 50° C. the said phthalocyanine in an anhydrous halogenating agent which consists essentially of on the one hand a compound of the Friedel-Crafts' type and on the other hand a compound of hexavalent sulfur selected from the group consisting of sulfur trioxide, sulfuric acid, HO.SO$_2$-halogen, metal-O.SO$_2$-halogen and lower alkyl-O.SO$_2$-halogen, at least one mol of aluminum chloride being used per mol of phthalocyanine and per mol of chlorosulfonic acid.

3. A process for the halogenation of a phthalocyanine, which comprises heating at temperatures above 50° C. the said phthalocyanine in an anhydrous halogenating agent which consists essentially of on the one hand anhydrous aluminum chloride and on the other hand a compound of hexavalent sulfur selected from the group consisting of sulfur trioxide, sulfuric acid, HO.SO$_2$-halogen, metal-O.SO$_2$-halogen and lower alkyl-O.SO$_2$-halogen, at least one mol of aluminum chloride being used per mol of phthalocyanine and per mol of chlorosulfonic acid.

4. A process for the halogenation of a phthalocyanine which comprises heating at temperatures above 50° C. the said phthalocyanine in an anhydrous halogenating agent which consists essentially of on the one hand anhydrous aluminum chloride and on the other hand a halogen sulfonic acid in the presence of a salt which lowers the melting point and which is stable under the reaction conditions at least one mol of aluminum chloride being used per mol of phthalocyanine and per mol of chlorosulfonic acid.

5. A process for the halogenation of a phthalocyanine, which comprises heating at temperatures above 50° C. the said phthalocyanine in an anhydrous halogenating agent which consists essentially of on the one hand anhydrous aluminum chloride and on the other hand an alkyl sulfonic acid in the presence of a salt which lowers the melting point and which is stable under the reaction conditions at least one mol of aluminum chloride being used per mol of phthalocyanine and per mol of chlorosulfonic acid.

6. A process for the halogenation of a phthalocyanine, which comprises heating at temperatures above 50° C. the said phthalocyanine in an anhydrous halogenating agent which consists essentially of on the one hand anhydrous aluminum chloride and on the other hand sulfur trioxide in the presence of a salt which lowers the melting point and which is stable under the reaction conditions at least one mol of aluminum chloride being used per mol of phthalocyanine and per mol of chlorosulfonic acid.

7. A process for the chlorination of a metal phthalocyanine which comprises heating at temperatures between 120° and 200° C. said compound in an anhydrous chlorinating agent which consists essentially of on the one hand anhydrous aluminum chloride and on the other hand chlorosulfonic acid in the presence of an alkali metal chloride, at least one mol of aluminum halide being used per mol of phthalocyanine and per mol of chlorosulfonic acid.

8. A process for the chlorination of metal-free phthalocyanine which comprises heating at temperatures between 120° and 200° C. said compound in an anhydrous chlorinating agent which consists essentially of on the one hand anhydrous aluminum chloride and on the other hand chlorosulfonic acid in the presence of an alkali metal halide, at least one mol of aluminum chloride being used per mol of phthalocyanine and per mol of chlorosulfonic acid.

9. A process for the chlorination of copper phthalocyanine which comprises heating at temperatures between 120° and 200° C. said compound in an anhydrous chlorinating agent which consists essentially of on the one hand anhydrous aluminum chloride and on the other hand chlorosulfonic acid in the presence of an alkali metal halide, at least one mol of aluminum chloride being used per mol of phthalocyanine and per mol of chlorosulfonic acid.

10. A process for the introduction of at least 14 chlorine atoms into copper phthalocyanine which comprises heating at temperatures between 120° and 200° C. said compound in an anhydrous chlorinating agent which consists essentially of on the one hand anhydrous aluminum chloride and on the other hand chlorosulfonic acid in the presence of an alkali metal chloride, at least one mol of aluminum chloride being used per mol of chlorosulfonic acid and at least 14 mols of chlorosulfonic acid being used per mol of phthalocyanine.

11. A process for the introduction of at least 10 chlorine atoms into a metal-free phthalocyanine which comprises heating at temperatures between 120° and 200° C. said compound in an anhydrous chlorinating agent which consists essentially of on the one hand anhydrous aluminum chloride and on the other hand chlorosulfonic acid in the presence of an alkali metal chloride, at least one mol of aluminum chloride being used per mol of chlorosulfonic acid and at least 10 mols of chlorosulfonic acid being used per mol of phthalocyanine.

References Cited in the file of this patent

UNITED STATES PATENTS

| | | |
|---|---|---|
| 2,276,860 | Niemann et al. | Mar. 17, 1942 |
| 2,662,085 | Holtzman et al. | Dec. 8, 1953 |
| 2,793,214 | Holtzman et al. | May 21, 1957 |

FOREIGN PATENTS

| | | |
|---|---|---|
| 1,027,650 | France | Feb. 18, 1953 |
| 928,344 | Germany | May 31, 1955 |
| 929,081 | Germany | June 20, 1955 |
| 688,784 | Great Britain | Mar. 11, 1953 |
| 281,990 | Switzerland | Dec. 1, 1952 |

UNITED STATES PATENT OFFICE
Certificate of Correction

December 2, 1958

Patent No. 2,862,929     Armin Caliezi et al.

It is hereby certified that error appears in the printed specification of the above numbered patent requiring correction and that the said Letters Patent should read as corrected below.

Column 2, line 45, extreme right-hand portion of the formula, for $$Cl^{\oplus} + X{-}Cl \quad \text{read} \quad H^{\oplus} + X{-}Cl$$

column 5, line 1, after "compound", insert —of—.

Signed and sealed this 16th day of June 1959.

[SEAL]

Attest:
KARL H. AXLINE,
*Attesting Officer.*

ROBERT C. WATSON,
*Commissioner of Patents.*